US009444821B2

(12) United States Patent
Fukushima et al.

(10) Patent No.: US 9,444,821 B2
(45) Date of Patent: Sep. 13, 2016

(54) MANAGEMENT SERVER, COMMUNICATION CUTOFF DEVICE AND INFORMATION PROCESSING SYSTEM (75) Inventors: Wataru Fukushima, Kahoku (JP); Takuma Iryo, Kahoku (JP); Tatsuya Komano, Kahoku (JP); Masatoshi Yamamoto, Kahoku (JP)

(73) Assignee: PFU LIMITED, Kahoku-shi (JP)

( * ) Notice: Subject to any disclaimer, the term of this patent is extended or adjusted under 35 U.S.C. 154(b) by 768 days.

(21) Appl. No.: 13/190,611

(22) Filed: Jul. 26, 2011

(65) Prior Publication Data
US 2012/0030351 A1 Feb. 2, 2012

(30) Foreign Application Priority Data
Jul. 29, 2010 (JP) .................................. 2010-171037

(51) Int. Cl.
G06F 15/173 (2006.01)
*H04L 29/06* (2006.01)
*H04L 12/26* (2006.01)
*H04L 29/12* (2006.01)

(52) U.S. Cl.
CPC ............. *H04L 63/101* (2013.01); *H04L 43/12* (2013.01); *H04L 61/103* (2013.01)

(58) Field of Classification Search
CPC .... H04L 63/101; H04L 43/12; H04L 61/103
USPC .............................................. 709/224; 726/3
See application file for complete search history.

(56) References Cited

U.S. PATENT DOCUMENTS

| 6,070,243 A * | 5/2000 | See ........................ G06F 21/31 |
|---|---|---|
| | | 709/229 |
| 6,745,333 B1 | 6/2004 | Thomsen |
| 2002/0131368 A1* | 9/2002 | Raftelis .................. H04L 41/08 |
| | | 370/241 |

(Continued)

FOREIGN PATENT DOCUMENTS

| JP | 2002204252 A | * | 7/2002 |
|---|---|---|---|
| JP | 2002354006 A | * | 12/2002 |

(Continued)

OTHER PUBLICATIONS

Korpinen, Pekka. Using reconfigurable hardware to distribute network traffic for parallel processing. Diss. Helsinki University of Technology, 2009.*

(Continued)

*Primary Examiner* — Kostas Katsikis
(74) *Attorney, Agent, or Firm* — Westerman, Hattori, Daniels & Adrian, LLP (57) ABSTRACT

An inspection system 1 having a plurality of network segments 2 includes: a management information acquiring unit 34 which acquires a node ID that a node 90 belonging to the network segment 2 can be identified and a segment ID that the network segment 2 to which the node 90 belongs can be identified; a management information accumulating unit 35 which accumulates the acquired node ID and segment ID in the way of being associated with each other; a cutoff determining unit 36 which determines whether the cutoff of the communications of the node 90 specified by the accumulated node ID and segment ID is required or not; and a communication cutoff unit 21 which cuts off the communications of the node 90 specified by the node ID in the case of determining that the cutoff of the communications of the node 90 is required.

3 Claims, 9 Drawing Sheets

(56) References Cited

U.S. PATENT DOCUMENTS

| | | | |
|---|---|---|---|
| 2002/0131418 A1* | 9/2002 | Raftelis | H04J 3/085 370/395.3 |
| 2002/0131431 A1* | 9/2002 | Wank | H04J 3/1611 370/403 |
| 2002/0133698 A1* | 9/2002 | Wank | H04L 45/00 713/151 |
| 2005/0015470 A1* | 1/2005 | de Heer et al. | 709/221 |
| 2005/0021846 A1* | 1/2005 | Tzeng | H04L 29/12009 709/238 |
| 2005/0055573 A1* | 3/2005 | Smith | G06F 21/6218 726/4 |
| 2005/0157750 A1* | 7/2005 | Rabie | H04L 12/28 370/466 |
| 2006/0117058 A1* | 6/2006 | Smith | H04L 63/105 |
| 2006/0130126 A1* | 6/2006 | Touve | H04L 63/0815 726/5 |
| 2007/0274525 A1* | 11/2007 | Takata | H04L 63/065 380/270 |
| 2008/0072289 A1 | 3/2008 | Aoki et al. | |
| 2009/0168645 A1* | 7/2009 | Tester et al. | 370/225 |
| 2009/0172156 A1* | 7/2009 | Yadav | H04L 29/12028 709/224 |
| 2010/0241744 A1* | 9/2010 | Fujiwara | 709/224 |
| 2011/0238820 A1* | 9/2011 | Matsuoka | G06F 9/5077 709/224 |
| 2012/0030332 A1* | 2/2012 | Fukushima | H04L 41/0672 709/223 |
| 2012/0089742 A1* | 4/2012 | Jagannatharao | H04L 12/4641 709/229 |

FOREIGN PATENT DOCUMENTS

| | | | | |
|---|---|---|---|---|
| JP | 2004336501 A | * | 11/2004 | |
| JP | WO 2005069551 A1 | * | 7/2005 | H04L 12/4633 |
| JP | 2007-235662 A | | 9/2007 | |
| JP | 2007235662 A | * | 9/2007 | |
| JP | 2008-60766 A | | 3/2008 | |
| JP | 2008-118259 A | | 5/2008 | |
| JP | 2011087068 A | * | 4/2011 | |
| JP | 2012027869 A | * | 2/2012 | |
| WO | 2006/006217 A1 | | 1/2006 | |

OTHER PUBLICATIONS

Japanese Office Action dated Oct. 1, 2013, issued in corresponding Japanese Patent Application No. 2010-171037, w/ English translation.

* cited by examiner

MANAGEMENT SERVER, COMMUNICATION CUTOFF DEVICE AND INFORMATION PROCESSING SYSTEM

CROSS-REFERENCE TO RELATED APPLICATION

This application is based upon and claims the benefit of priority of the prior Japanese Patent Application No. JP2010-171037, filed on Jul. 29, 2010, the entire contents of which are incorporated herein by reference.

FIELD

The present invention relates to a technology of managing an information processing device connected to a network.

BACKGROUND

There has hitherto been an unauthorized access prevention device (refer to Japanese Patent Laid-Open Publication No. 2007-235662) including: an access right determining unit which determines, when receiving an ARP (Address Resolution Protocol)-based request via a network, whether a requester terminal of this ARP request is an authorized terminal or not; a PAUSE frame transmitting unit which transmits, when determining that the requester terminal is an unauthorized terminal, a PAUSE frame for stopping a transmission function of the unauthorized terminal over a preset period of time in the way of being addressed to at least one of the unauthorized terminal and the authorized terminal; and a spoofed ARP response unit which disables the communications with the authorized terminal by transmitting a spoofed ARP response against the ARP request to the unauthorized terminal during the period for which the PAUSE frame transmitting unit transmits the PAUSE frame.

Further, there has been also an IP terminal device (refer to Japanese Patent Laid-Open Publication No. 2008-118259) including: an ARP communication unit which broadcasts an ARP packet addressed to an IP address of a communication partner terminal and receives the ARP packet or an ARP response addressed to an IP address of a self-device; an ARP response unit which sends back the ARP response in response to the ARP packet given from the communication partner terminal; a MAC (Media Access Control) address communication unit which mutually receives a MAC address on the communication partner side when starting a session; and a packet communication unit which performs voice packet communications with the communication partner terminal by use of the MAC address on the communication partner side, in which the ARP response unit, upon receiving the MAC address on the communication partner side, stops sending back the ARP response in response to the ARP packet even when receiving the ARP packet addressed to the IP address of the self-device till the session is finished.

For example, in the case of cutting off the communications of a not-yet-authorized information processing device for the purpose of preventing an unauthorized use of the network, it is required that the information processing device connected to the network is managed by checking whether this information processing device is an already-authorized device or a not-yet-authorized device. This type of management has hitherto involved adopting a method of recording an identifier of the already-authorized information processing device in a whitelist and recording, if necessary, an identifier of the not-yet-authorized device in a blacklist.

According to the method of managing the information processing device by use of the list registered with the identifier of the information processing device, however, if a plurality of information processing devices having the same identifier is connected, it is difficult to identify (distinguish between) these information processing devices. Especially in the case of establishing the connection of the not-yet-authorized information processing device spoofed by the same identifier as the identifier of the already-authorized information processing device, it is difficult to determine whether the information processing device is the already-authorized device or the not-yet-authorized device by distinguishing between these information processing devices.

SUMMARY

According to an aspect of the invention, there is provided a management server which manages a plurality of network segments, including: management information acquiring means to acquire device identifying information from which an information processing device belonging to the network segment can be identified and segment identifying information from which the network segment to which the information processing device belongs can be identified; management information accumulating means to accumulate the device identifying information and the segment identifying information acquired by the management information acquiring means in the way of being associated with each other so as to make it possible to determine whether cutoff of communications of the information processing device specified by the device identifying information and the segment identifying information is required or not; cutoff requirement determining means to determine whether the cutoff of the communications of the information processing device specified by the device identifying information and the segment identifying information accumulated by the management information accumulating means is required or not; and cutoff requirement notifying means to notify a communication cutoff device which cuts off the communications of the information processing device, of the requirement or non-requirement of the communication cutoff that is determined by the cutoff requirement determining means.

DESCRIPTION OF EMBODIMENTS

The present embodiment adopts the following units in order to solve the problems given above. Namely, the present embodiment is a management server which manages a plurality of network segments, including: a management information acquiring unit to acquire device identifying information from which an information processing device belonging to the network segment can be identified and segment identifying information from which the network segment to which the information processing device belongs can be identified; a management information accumulating unit to accumulate the device identifying information and the segment identifying information acquired by the management information acquiring unit in the way of being associated with each other so as to make it possible to determine whether cut-off of communications of the information processing device specified by the device identifying information and the segment identifying information is required or not; a cut-off requirement determining unit to determine whether the cut-off of the communications of the information processing device specified by the device identifying information and the segment identifying information accumulated by the management information accumulating unit is required or not; and a cut-off requirement notifying unit to notify a communication cut-off device which cuts off the communications of the information processing device, of the requirement or non-requirement of the communication cut-off that is determined by the cut-off requirement determining unit.

Further, the present embodiment can be grasped as a communication cutoff device connected to the network segment. Namely, the present embodiment is a communication cutoff device including: a device identifying information acquiring unit to acquire device identifying information from which an information processing device belonging to a network segment can be identified; a management information transmitting unit to transmit, to a management server, the device identifying information and segment identifying information from which the network segment to which the information processing device specified by the device identifying information belongs can be identified in the way of being associated with each other; a cutoff requirement acquiring unit to acquire, from the management server, information about whether the cutoff of the communications of the information processing device specified by the device identifying information is required or not; and a communication cutoff unit to cut off the communications of the information processing device if the cutoff requirement acquiring unit acquires the information indicating that the cutoff of the communications of the information processing device specified by the device identifying information is required.

Further, the present embodiment can be also grasped as an information processing system having a plurality of network segments. Namely, the present embodiment is an information processing system having a plurality of network segments, including: a management information acquiring unit to acquire device identifying information from which an information processing device belonging to the network segment can be identified and segment identifying information from which the network segment to which the information processing device belongs can be identified; a management information accumulating unit to accumulate the device identifying information and the segment identifying information acquired by the management information acquiring unit in the way of being associated with each other so as to make it possible to determine whether cutoff of communications of the information processing device specified by the device identifying information and the segment identifying information is required or not; a cutoff requirement determining unit to determine whether the cutoff of the communications of the information processing device specified by the device identifying information and the segment identifying information accumulated by the management information accumulating unit is required or not; and a communication cutoff unit to cut off the communications of the information processing device specified by the device identifying information if the cutoff requirement determining unit determines that the cutoff of the communications of the information processing device is required.

Furthermore, the present embodiment can be grasped as a method or a program executed by the computer. Moreover, the present embodiment may also be a recording medium recorded with this program, which can be read by the computer, other devices and machines. Herein, the recording medium readable by the computer etc connotes a recording medium capable of storing information such as data and programs electrically, magnetically, optically, mechanically or by chemical action, which can be read from the computer etc.

According to the present embodiment, in the system for managing the devices connected to the network, it is feasible to distinguish between the plural devices having the same identifier.

DESCRIPTION BASED ON THE DRAWINGS

An embodiment in the case of carrying out an information processing system according to the present invention by way of an inspection system, will hereinafter be described on the basis of the drawings. The information processing system according to the present invention can be, however, utilized widely for the purpose of managing information processing devices belonging to a network, and therefore an application target of the present invention is not limited to the inspection system.

<System Architecture>

Figure 1:
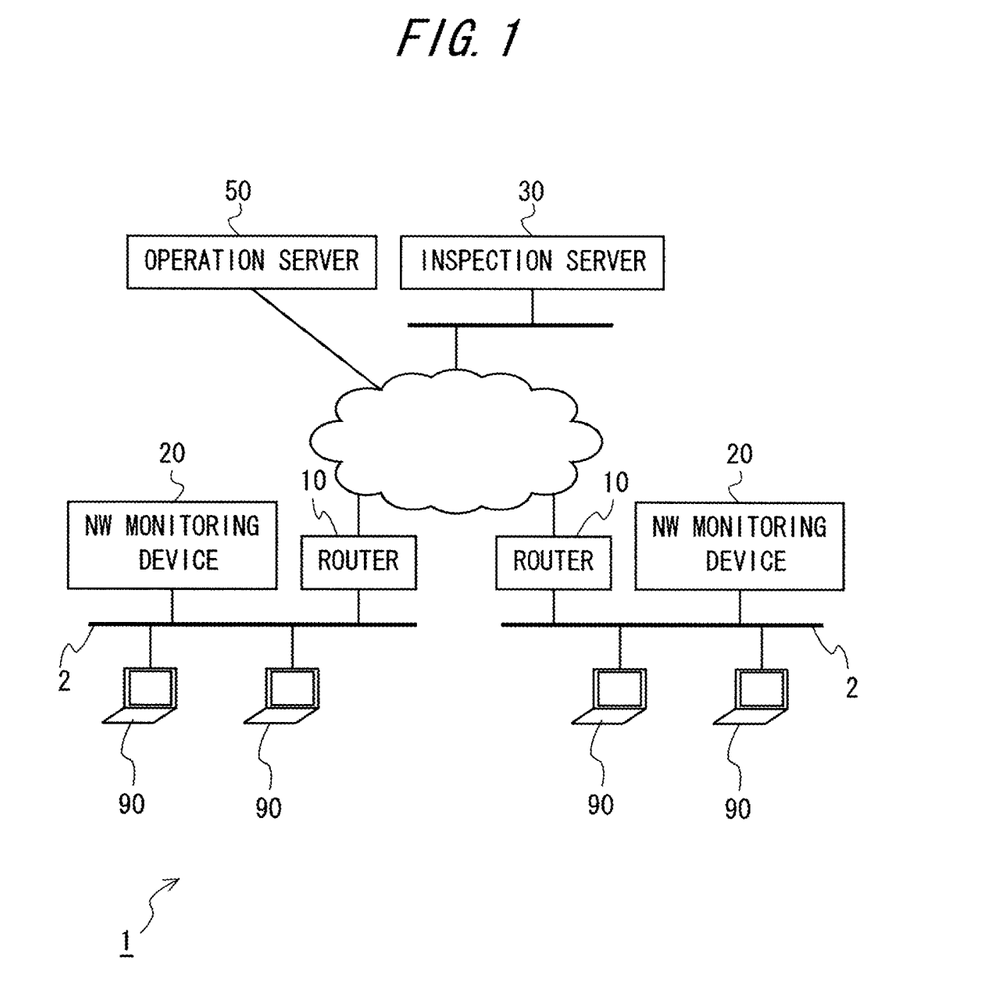
FIG. 1 is a schematic diagram illustrating an architecture of an inspection system according to an embodiment.

FIG. 1 is a schematic diagram illustrating an architecture of an inspection system 1 according to the embodiment. The inspection system 1 according to the embodiment includes a plurality of network segments 2 to which a plurality of inspection target information processing devices 90 (which will hereinafter be simply termed [nodes 90]) is connected, an inspection server 30 and an operation server 50, which servers are connected to the network segments 2 in a communication-enabled manner via routers 10. Then, a network monitoring device 20 for cutting off communications of the node 90 remaining in an uninspected status, is connected to each network segment 2. Herein, the network segments represent respective segments of the network in the case of segmenting the whole network according to a predetermined standard. In other words, the network related to the information processing system according to the present embodiment can be configured by establishing communication-enabled connections between the plurality of network segments via relay devices such as routers and switches. For example, the network segment can be defined by a packet reachable range of a broadcast packet on a data link layer.

Note that the network monitoring device 20 corresponds to a communication cutoff device according to the present invention, the inspection server 30 corresponds to a management server which manages the plurality of network segments 2 according to the present invention. Further, the operation server 50 provides a service for operations to the node 90, and the inspection server 30 provides an inspection service to the node 90 connected to the network segment 2.

In the inspection system 1 according to the embodiment, a variety of servers to which the nodes 90 are connected at remote places via the Internet and a wide area network (WAN) and provided by, e.g., ASP (Application Service Provider). It should be noted that, however, these servers may not necessarily be connected at the remote places. For example, these servers may also be connected onto a local area network (LAN) where the nodes 90 and the network monitoring device 20 exist.

Figure 2:
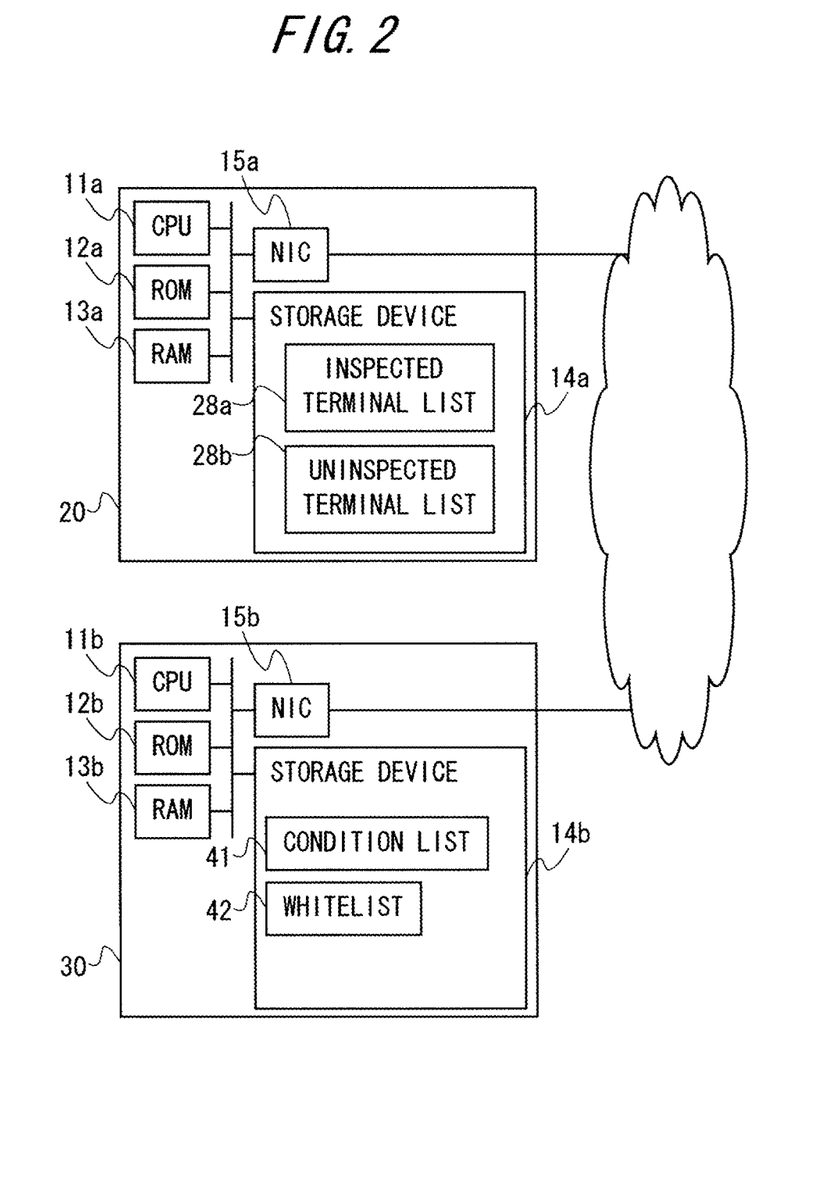
FIG. 2 is a diagram illustrating hardware configurations of a network monitoring device and an inspection server according to the embodiment.

FIG. 2 is a diagram illustrating hardware configurations of the network monitoring device 20 and the inspection server 30 according to the embodiment. Note that FIG. 2 omits illustrations of components (the router 10, the node 90, the operation server 50, etc) other than the network monitoring device 20 and the inspection server 30. The network monitoring device 20 and the inspection server 30 are computers each equipped with CPUs (Central Processing Units) 11a, 11b, RAMS (Random Access Memories) 13a, 13b, ROMs (Read Only Memories) 12a, 12b, storage devices 14a, 14b such as an EEPROM (Electrically Erasable and Programmable Read Only Memory) and a HDD (Hard Disk Drive), communication units such as NICs (Network Interface Cards) 15a, 15b and so on.

Herein, the storage device 14a of the network monitoring device 20 is recorded with, in addition to a program for controlling the network monitoring device 20, an inspected terminal list 28a and an uninspected terminal list 28b. The inspected terminal list 28a contains a list of identifying information for identifying the terminals that undergo completion of the inspection by the inspection server 30 and are permitted to connect with the operation server 50 and other nodes 90. Further, the uninspected terminal list 28b contains a list of identifying information for identifying the terminals that do not yet undergo the completion of the inspection by the inspection server 30 and therefore should be cut off in their network-based communications by the network monitoring device 20. A scheme of the embodiment is that the inspected terminal list 28a and the uninspected terminal list 28b are recorded with MAC (Media Access Control) addresses of the nodes 90, thereby distinguishing between the inspected terminal and the uninspected terminal.

Furthermore, the storage device 14b of the inspection server 30 is recorded with, in addition to a program for controlling the inspection server 30, a condition list 41 and a whitelist (approved list) 42. The condition list 41 is accumulated with conditions (e.g., a system condition of the node 90, a version condition of the system software, recommended setting contents of the system, a condition of security software, a version condition of a definition file, a version condition of a malware detection engine, etc.) for determining whether or not mainly a security-related environment of the node 90 satisfies a predetermined security policy enabling participation in the network and the connection to the operation server 50 to be permitted.

The whitelist 42 contains a list of identifying information for identifying the nodes 90 that undergo the completion of the inspection by the inspection server 30 and are permitted to connect with the operation server 50 and other nodes 90.

To be specific, the whitelist is recorded with device identifying information (which will hereinafter be referred to as a [node ID]) from which the communication-permitted node 90 can be identified. Note that in the embodiment the whitelist 42 is generated for every network segment 2 and is managed in the way of being associated with segment identifying information (which will hereinafter be referred to as [segment ID]) from which the individual network segment 2 can be identified. Thus, in the embodiment, the network monitoring device 20 manages the network segment 2 and the node ID (MAC address) of the node 90 on a connected basis. The nodes 90 belonging to the plurality of network segments 2 may also, however, be managed based on the single whitelist 42 by recording the segment IDs together with the node IDs.

Figure 3:
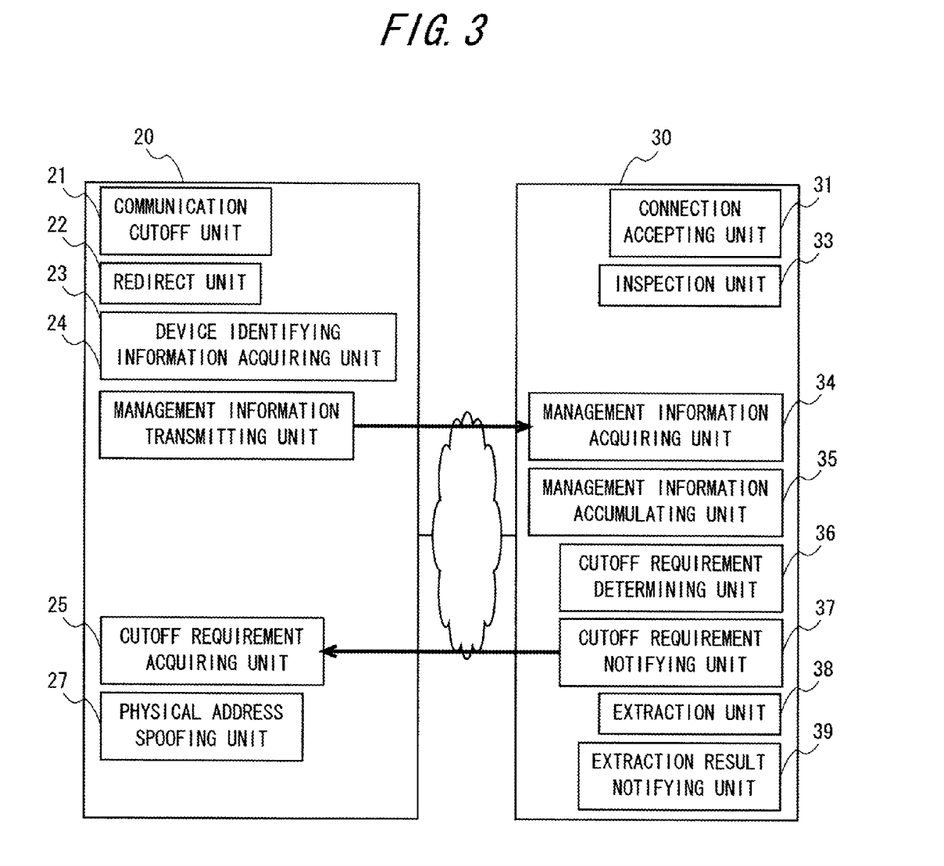
FIG. 3 is a diagram illustrating functional configurations of the network monitoring device and the inspection server according to the embodiment.

FIG. 3 is a diagram schematically illustrating functional configurations of the network monitoring device 20 and the inspection server 30 according to the embodiment. Incidentally, FIG. 3 omits illustrations of the components (the router 10, the node 90, the operation server 50, etc) other than the network monitoring device 20 and the inspection server 30. A program recorded in the storage device 14a is read into the RAM 13a and executed by the CPU 11a, whereby the network monitoring device 20 functions as a communication cutoff device including a communication cutoff unit (program module) 21, a redirect unit (module) 22, a device identifying information acquiring unit (module) 23, a management information transmitting unit (module) 24, a cutoff requirement acquiring unit (module) 25 and a physical address spoofing unit (module) 27. Note that the respective functions provided in the communication cutoff device are executed by the CPU 11a defined as a general-purpose processor in the embodiment, however, a part or the whole of these functions may also be executed by one single or a plurality of dedicated processors.

Further, a program recorded in the storage device 14b is read into the RAM 13b and executed by the CPU 11b, whereby the inspection server 30 functions as a management server including a connection accepting unit (module) 31, an inspection unit (module) 33, a management information acquiring unit (module) 34, a management information accumulation unit (module) 35, a cutoff requirement determining unit (module) 36, a cutoff requirement notifying unit (module) 37, an extraction unit (module) 38 and an extraction result notifying unit (module) 39. Note that the respective functions provided in the management server are executed by the CPU 11b defined as the general-purpose processor in the embodiment, however, a part or the whole of these functions may also be executed by one single or the plurality of dedicated processors.

<Processing Flow>

Next, a flow of processes executed by the inspection system 1 according to the embodiment will hereinafter be described with reference to a flowchart.

Figure 4:
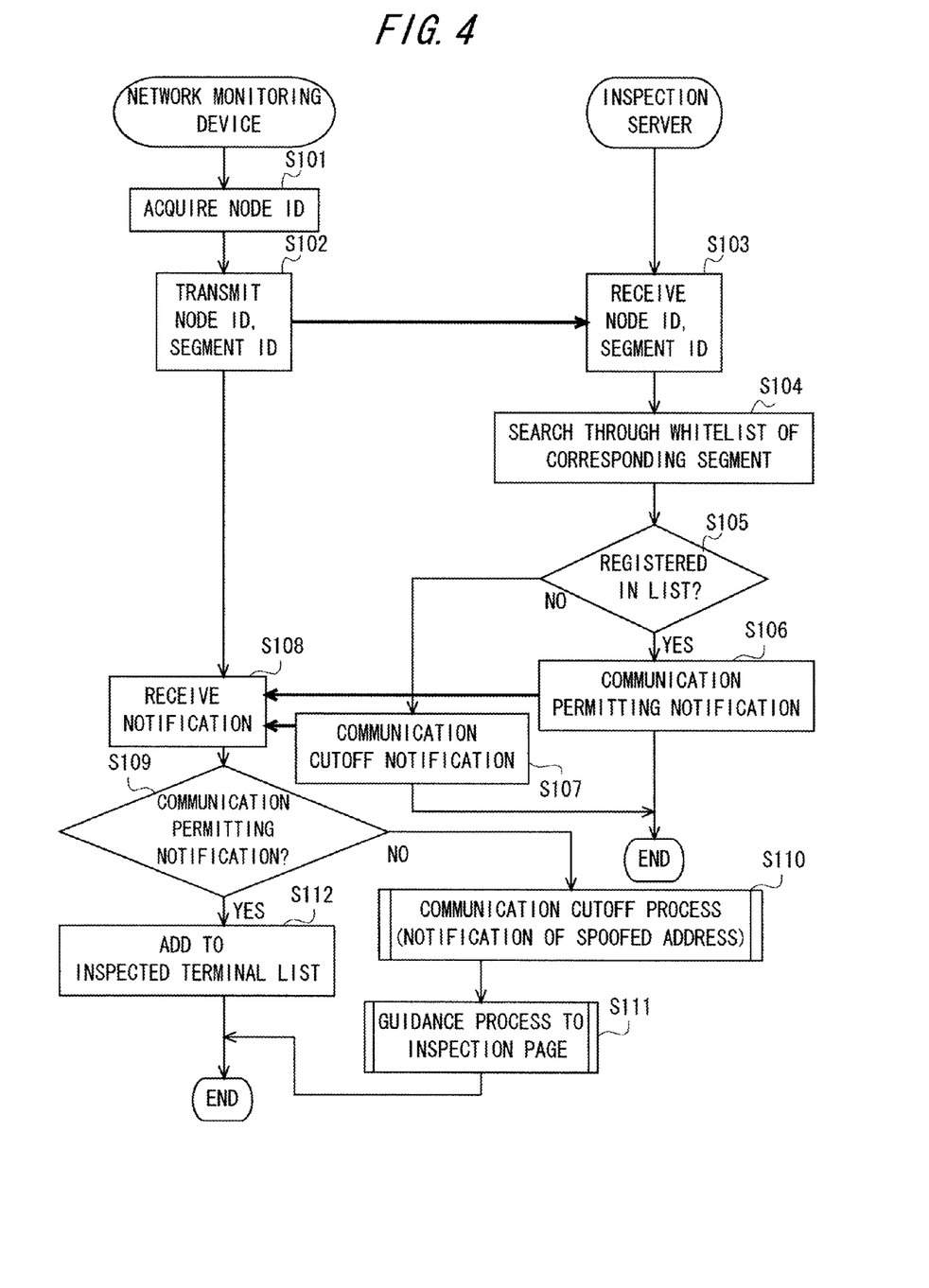
FIG. 4 is a flowchart illustrating a flow of a node management process according to the embodiment.

FIG. 4 is a flowchart illustrating a flow of a node management process according to the embodiment. In the inspection system 1 described above, a start of the node management according to the embodiment is triggered by an event that the node 90 of a user participates in the network segment 2, or alternatively this node management process is periodically executed. Note that a specific content and a specific processing sequence of the processes given in the flowchart are each one example for carrying out the present invention. The specific content and the specific processing sequence of the processes may be properly selected corresponding to the embodiment of the present invention.

In step S101, the network monitoring device 20 acquires the node ID (the device identifying information) from each individual node 90 belonging to the network segment 2 can be identified. In the embodiment, the MAC address of the node 90 is used as the node ID. The device identifying information acquiring unit 23 of the network monitoring device 20 acquires broadcast packets etc such as ARP address resolution requests transmitted by the nodes 90 by obtaining all of packets including those not addressed to the self MAC address, which flow across the network segment 2, thus acquiring the MAC addresses of the nodes 90.

More specifically, the network monitoring device 20 obtains all of the packets including those not addressed to the self MAC address, which flow across the network segment 2, and collates a source MAC address of the obtained packet with the MAC addresses retained in the inspected terminal list 28a and the uninspected terminal list 28b. As a result of the collation, if the source MAC address of the obtained packet is contained in neither the inspected terminal list 28a nor the uninspected terminal list 28b, the communication cutoff unit 21 determines that a new node 90 is connected to the network segment 2, and acquires the MAC address of the new node 90. Thereafter, the processing proceeds to step S102.

In step S102, the node ID and the segment ID are transmitted. The management information transmitting unit 24 of the network monitoring device 20 acquires the segment ID (the segment identifying information) from which the individual network segment 2 can be identified by a method such as reading the segment ID from the storage device 14a, and transmits the node ID and the segment ID acquired in step S101 to the inspection server 30 in the way of being associated with each other. In the embodiment, the MAC address of the network monitoring device 20 is utilized as the segment ID. The segment ID may, however, involve using other items of information such as a manufacturer's serial number of the network monitoring device 20 and a WAN address of the router 10, from which the network segment 2 can be identified. Thereafter, the processing proceeds to step S103.

In step S103 and step S104, the node ID and the segment ID are received, and a search through the whitelist 42 is done. The management information acquiring unit 34 of the inspection server 30 receives the node ID and the segment ID each transmitted from the network monitoring device 20 (step S103). Then, the cutoff requirement determining unit 36 of the inspection server 30 specifies, based on the segment ID received in step S103, the whitelist 42 associated with the network segment 2, and searches through the thus-specified whitelist 42 by use of the received node ID (step S104). Thereafter, the processing proceeds to step S105.

In step S105 through step S107, a communication permitting notification or a communication cutoff notification is transmitted based on a result of the search through the whitelist 42. The cutoff requirement determining unit 36 of the inspection server 30 determines from the search result whether or not the acquired node ID is registered in the whitelist 42 associated with the acquired segment ID, thereby determining whether the cutoff of the communications related to the node 90 specified by the node ID and the segment ID is required or not (step S105). If the acquired node ID is registered in the whitelist 42 associated with the acquired segment ID, the cutoff requirement notifying unit 37 of the inspection server 30 transmits, to the network monitoring device 20, the communication permitting notification indicating that the cutoff of the communications related to the node 90 specified by the node ID is not required (step S106). Whereas if the acquired node ID is not registered in the whitelist 42 associated with the acquired segment ID, the cutoff requirement notifying unit 37 of the inspection server 30 transmits, to the network monitoring device 20, the communication cutoff notification indicating that the cutoff of the communications related to the node 90 specified by the node ID is required (step S107). Thereafter, the processing proceeds to step S108.

In step S108 through step S112, a result-of-search notification about the whitelist 42, which is transmitted from the inspection server 30, is received, and the communications with the node 90 are permitted or cut off based on a content of the notification. The cutoff requirement acquiring unit 25 of the network monitoring device 20, upon receiving the communication permitting notification or the communication cutoff notification from the inspection server 30 (step S108), determines whether the content of the received notification represents the communication permitting notification or the communication cutoff notification (step S109). If the content of the received notification represents the communication permitting notification, the network monitoring device 20 adds the MAC address of the node 90 related to the communication permitting notification to the inspected terminal list 28a (step S112). Note that the network monitoring device 20, if the MAC address of the node 90 related to the communication permitting notification is registered in the uninspected terminal list 28b, deletes this MAC address.

The network monitoring device 20 utilized in the embodiment is configured to cut off the communications of the node 90 which are guided to the destination of the packet transmission based on the ARP spoofing and therefore, if the content of the received notification represents the communication permitting notification, has no necessity for executing any special process for permitting the communications of the node 90. If the target node 90 has already undergone the cutoff of the communications due to the ARP spoofing, however, the network monitoring device 20 permits the communication of the node 90 by use of a method for canceling the ARP spoofing in a way that notifies the target node 90 of a correct MAC address of the router 10 and a method for transferring, to a correct destination, the packet coming from the node 90 that is guided to the network monitoring device 20 on the basis of the ARP spoofing.

By contrast, if the content of the received notification represents the communication cutoff notification, the physical address spoofing unit 27 and the communication cutoff unit 21 of the network monitoring device 20 cut off the communications of the node 90 by a method such as guiding the node 90 to the destination of the packet transmission on the basis of the ARP spoofing (step S110). Further, the physical address spoofing unit 27 of the network monitoring device 20 executes a guide process to an inspection page by a method such as transferring the packet acquired from the node 90 to the inspection server 30 on the basis of the ARP spoofing (step S111). In-depth descriptions of the communication cutoff process (step S110) and the guide process to the inspection page (step S111) will be made by use of FIG. 5.

Figure 5:
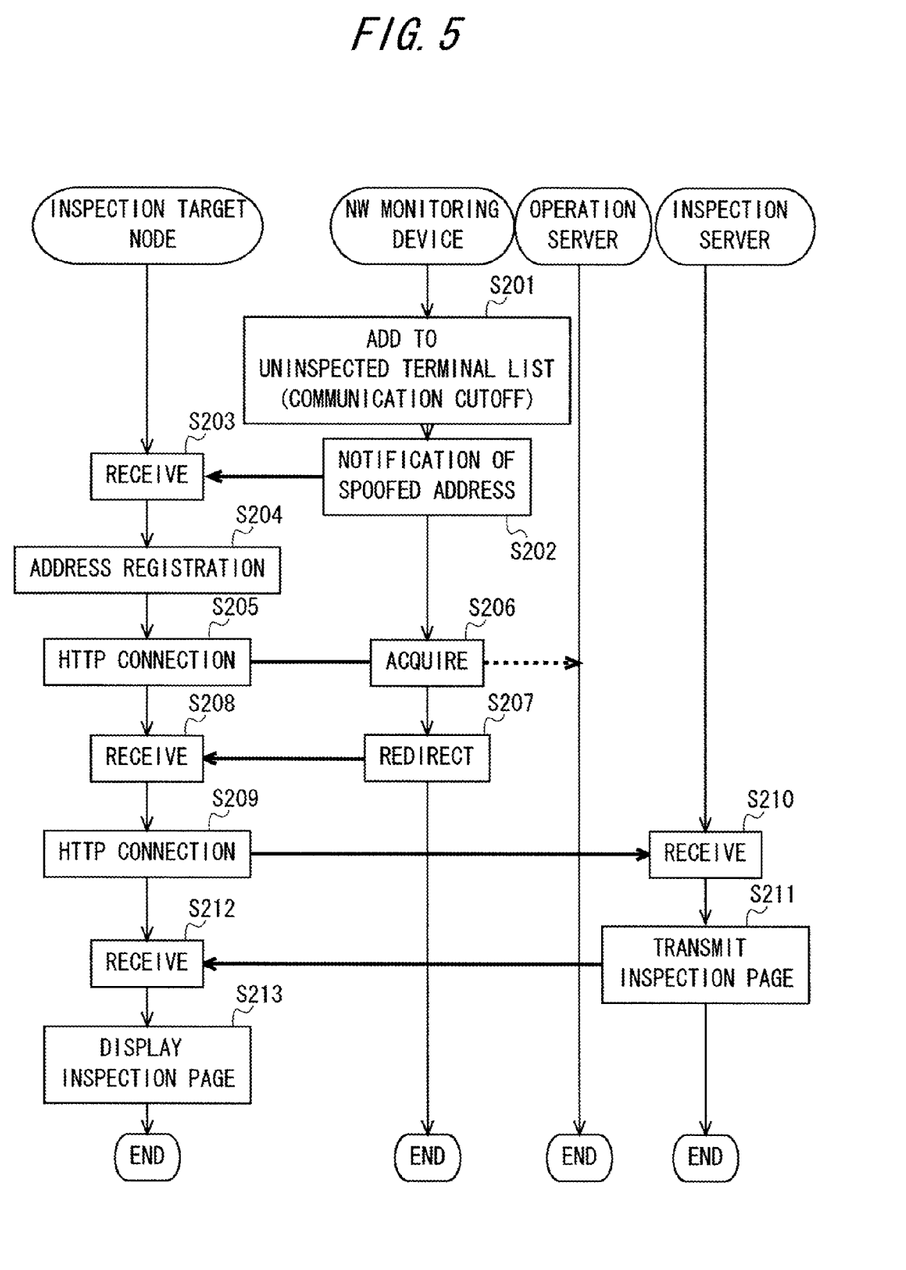
FIG. 5 is a flowchart illustrating a flow of a communication cutoff process and a flow of a guide process to an inspection page according to the embodiment.

FIG. 5 is a flowchart illustrating a flow of the communication cutoff process and the guide process to the inspection page according to the embodiment. The flowchart provides more detailed descriptions of the commutation cutoff process and the guide process to the inspection page given in step S110 and step S111 of FIG. 4. It should be noted that the specific content and the specific processing sequence given in this flowchart may be properly selected corresponding to the embodiment of the present invention.

The discussion starts with the communication cutoff process. The network monitoring device 20 records, in the uninspected terminal list 28b, the MAC address of the node 90 related to the communication cutoff notification received in step S108 of FIG. 4 (step S201). Then, the physical address spoofing unit 27 of the network monitoring device 20 transmits, to the node 90, the MAC address of the self-device (the network monitoring device 20) by way of the MAC address (which will hereinafter be also termed a [spoofed address]) of another terminal or the router 10 within the network segment 2 (step S202).

For example, the node 90 participating in the network broadcasts an ARP address resolution request in order to perform the communications with a want-to-communicate terminal (e.g., the operation server 50). Herein, if on a general type of network, the operation server 50 exists outside the network segment 2, and therefore it follows that the router 10 notifies the node 90 of the MAC address of the self-device (the router 10). In the network architecture according to the embodiment, however, the network monitoring device 20 is connected to the network segment 2, and this network monitoring device 20 notifies the node 90 of the MAC address (the spoofed address) of the self-device (the network monitoring device 20) in response to the address resolution request given from the node 90.

Moreover, the notification of the spoofed address to the node 90 from the network monitoring device 20 may be transmitted not as a response to the address resolution request sent from the node 90 but as an ARP request given from the network monitoring device 20.

In any case, the MAC address of which the node 90 is herein notified is used for spoofing the MAC address of the default router or another terminal within the network segment 2 with the MAC address of the network monitoring device 20. Hence, it follows that the network monitoring device 20 according to the embodiment gets the uninspected node 90 to register, in the address list, the MAC address of the network monitoring device 20 as the MAC address of the operation server 50 or another terminal within the network segment 2 (step S203, step S204).

Therefore, it follows that the uninspected node 90, in the case of trying to access the operation server and another terminal within the network segment 2, transmits the packet to the MAC address spoofed by the network monitoring device 20. In other words, the physical address spoofing unit 27 notifies the node 90 of the MAC address of the network monitoring device 20 by way of the MAC address of another device, thereby guiding the information transmitted from the node 90 to the network monitoring device 20. Then, the network monitoring device 20 discards (does not transfer), except the communications needed for the inspection which will be mentioned later on, a part or the whole of the packets transmitted from the node 90 recorded in the uninspected terminal list 28b. The communication cutoff unit 21 of the network monitoring device 20 cuts off a part or the whole of the communications of the uninspected node 90 by the method described above.

Note that the network monitoring device 20 transmits, it is preferable, the ARP response for the spoofing a plural number of times at a time interval in order to prevent the MAC address of the valid communication partner device from being retained in the access list held by the uninspected node 90.

Next, the guide process to the inspection page will be explained. The redirect unit 22 of the network monitoring device 20 redirects, if the communications acquired from the node 90 with the communications remaining to be cut off are classified as HTTP (HyperText Transfer Protocol)-based communications, the communications so as to connect with the inspection server 30 irrespective of the communication partner device (which is the operation server 50 in the example illustrated in FIG. 5) designated in a HTTP-based connection request (step S205 through step S207). The node 90, upon receiving the redirection request, connects with the predetermined inspection server 30 of which the network monitoring device notifies (steps S208, S209). Incidentally, on this occasion, the MAC address of the network monitoring device 20 is set in the "destination MAC address" field of the packet transmitted from the node 90, however, the network monitoring device 20 transfers the packet with its destination IP address being set to the inspection server 30 without cutting off (discarding) this packet.

Hereafter, during the node 90 is kept recorded in the uninspected terminal list 28b, the network monitoring device 20 transfers the packet of which the destination IP address is set to the inspection server 30 but discards (cuts off the communications) other packets without forwarding these packets. Through these processes, the node 90 can receive the inspection service while ensuring security of the network segment 2. Note that it is determined by referring to the destination IP address whether the packet transfer is required or not in the embodiment, however, other methods may be adopted. For example, it may also be determined by referring to, in addition to the destination IP address, a type of the communication protocol, a port number, URL (Uniform Resource Locator), etc whether the packet transfer is required or not.

The connection accepting unit 31 of the inspection server 30 receives the redirected HTTP-based connection, and the inspection server 30 transmits a Web page for the inspection to the node 90 (steps S210, S211). The node 90, which receives the Web page for the inspection, displays this Web page for the inspection (steps S212, S213). In the inspection system 1 according to the embodiment, the Web page for the inspection contains an input field for inputting authentication information (e.g., a user ID, a password, etc) for authenticating the user of the node 90 or the node 90 itself, the user requests the authentication by inputting the authentication information by use of an input device (a keyboard, a mouse, etc) of the node 90. Depending on an embodiment, however, the authentication method may involve adopting other methods, and the authentication may not be conducted.

Figure 6:
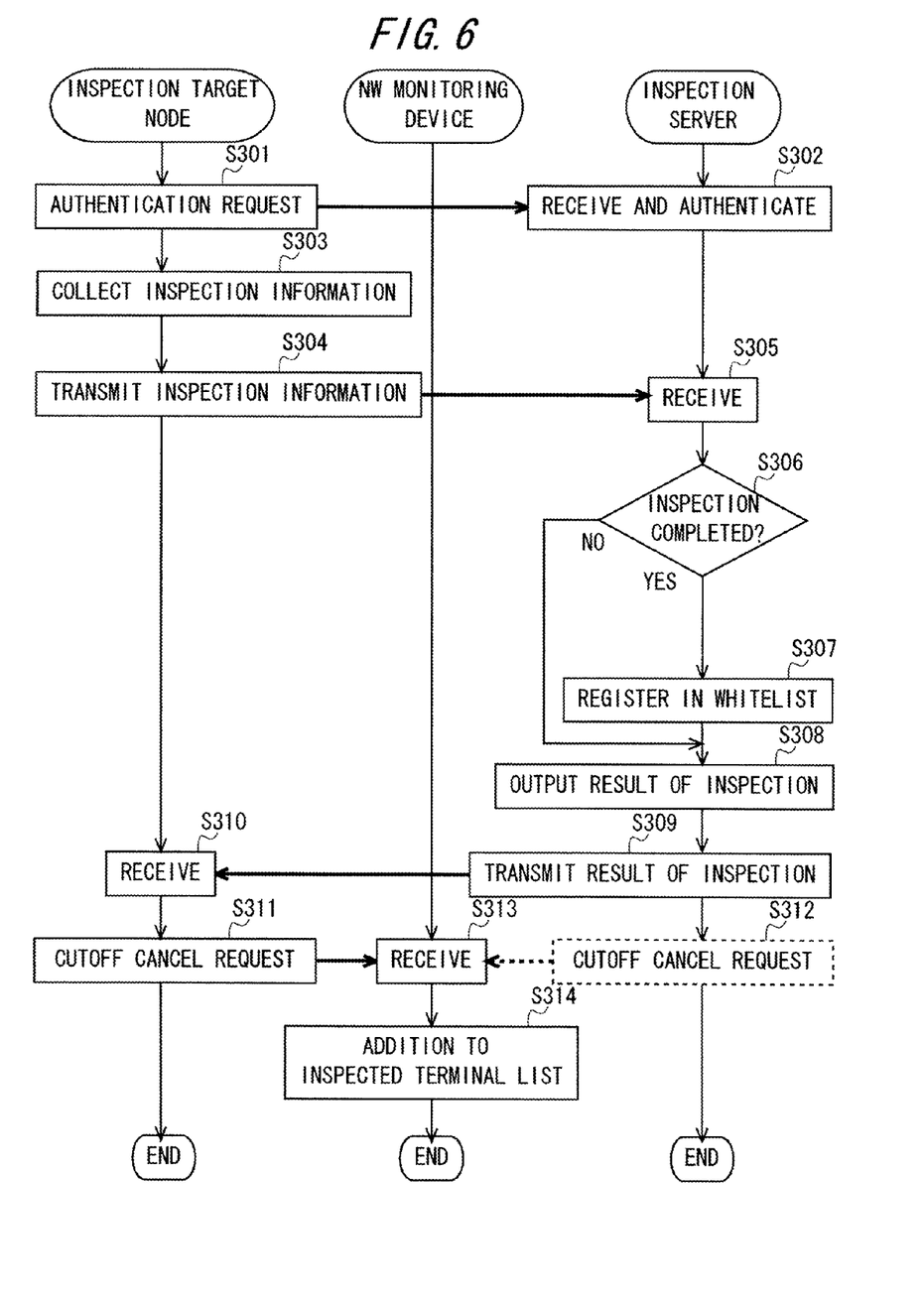
FIG. 6 is a flowchart illustrating a flow of an inspection process according to the embodiment.

FIG. 6 is a flowchart illustrating the inspection process according to the embodiment. A start of the inspection process according to the embodiment is triggered by such an event that the user inputs the information for the authentication to the Web page for the inspection displayed by the node 90. Note that specific contents of the process and a specific processing sequence illustrated in the flowchart are given by way of one example for carrying out the present invention. The specific contents of the process and the specific processing sequence may be properly selected according to an embodiment of the present invention.

The node 90 transmits, to the inspection server 30, an authentication request and an inspection request containing the authentication information (the user ID, the password, etc) inputted by the user (step S301). The inspection server 30 receiving the authentication request and the inspection request collates the user ID and the password contained in the received information with pre-retained items of user information, thereby authenticating the user or the node 90 (step S302).

Further, the node 90 collects pieces of information for the inspection (which will hereinafter be also referred to as [inventory]) (step S303). Timing at which the node 90 collects the inventory is not, however, limited to the example shown in the flowchart. It may be sufficient that the inventory is collected till transmitted to the inspection server 30, and hence it is preferable that the inventory collection timing is properly determined corresponding to the embodiment in the whole flow of the inspection process. The node 90 transmits the inventory collected in step S303 to the inspection server 30 (step S304).

When the inspection server 30 receives the inventory (step S305), the inspection unit 33 of the inspection server 30 inspects the node 90 by checking contents of the received inventory. To be specific, it is checked whether or not the various items of information (e.g., a system condition of the node 90, version information of the system software, setting contents of the system, security software information, version information of a definition file, version information of a malware detection engine, etc.) contained in the inventory (the information for the inspection) and related to an environment of the node 90 satisfy predetermined conditions given in the condition list 41, thereby determining whether the communication cutoff applied to the node 90 at the present may be canceled or not (step S306). When the result of the determination shows that the environment of the node 90 satisfies the predetermined conditions, the inspection comes to a completion. Further, when the result of the determination shows that the environment of the node does not satisfy the predetermined conditions, the inspection comes to non-acceptance.

Note that the inspection may involve a variety of methods other than the method described above. What may be adopted is, for instance, a method of comparing the various items of information on the environment of the node 90 which are contained in the inventory (the inspection information) with the predetermined conditions given in the condition list 41, then calculating a security level of a client on the basis of a compared result and determining, if the security level is equal to or higher than a fixed level, that the environment of the node 90 satisfies the predetermined conditions.

If the inspection result indicates the completion of the inspection (if the inspection result satisfies the predetermined conditions), the management information accumulating unit 35 of the inspection server 30 registers the node ID corresponding to the inspection result in the whitelist 42 associated with the segment ID of the segment to which the node 90 specified by the node ID belongs (step S307). Therefore, hereafter, a query about the same node ID is given from the network monitoring device 20 managing the same network segment 2, the inspection server 30 transmits the communication permitting notification to the network monitoring device 20 (refer to step S101 through step S106). If the node 90 having the same node ID as the node ID of the node 90 corresponding to the inspection result is connected to a network segment (a second network segment) other than the network segment 2 in which the node 90 corresponding to the inspection result undergoes the inspection, however, because of the whitelist being managed on a per network-segment-2 basis, the inspection server 30 refers to the whitelist associated with the second network segment 2 and thus determines whether the communication permitting notification or the communication cutoff notification is to be transmitted (refer to step S104 through step S107).

The inspection server 30 outputs, to a log, the inspection result, i.e., the result of determining whether the environment of the node 90 satisfies the predetermined conditions or not (step S308), and transmits this result in the form of the Web page to the node 90 (steps S309, S310).

If the inspection result indicates the completion of the inspection (if the inspection result satisfies the predetermined conditions), the node 90 transmits a cutoff cancel request to the network monitoring device 20 (step S311, step S313). The cutoff cancel request contains the node ID corresponding to the inspection result and cutoff cancel permitting information representing that the network monitoring device 20 may cancel the communication cutoff of the node 90. The network monitoring device 20 receiving the cutoff cancel request determines that the request is valid by carefully checking contents of the cutoff cancel request, then, if determined to be the valid cutoff cancel request, deletes the relevant MAC address from the uninspected terminal list 28*b* and adds this MAC address to the inspected terminal list 28*a* (step S314). Further, the network monitoring device 20 receiving the cutoff cancel request cancels the communication cutoff of the node 90. A specific canceling method is substantially the same as the communication permitting method described above, and hence its explanation is omitted.

Note that the cutoff cancel request may be sent to the network monitoring device 20 from the inspection server 30. In this case, the inspection server 30 transmits the cutoff cancel request to the network monitoring device 20 (step S312, step S313).

The inspection system 1 according to the embodiment can correctly recognize a different node 90 even if the node 90 having the same node ID (overlapped MAC address) is connected to the different network segment 2 because of managing the whitelist on the per network-segment basis (i.e., because of managing the node ID associated with the segment ID) and can perform the communication cutoff control or the communication permission control for each individual node 90. It is feasible to cut off especially the communications of the node 90 that tries to elude the inspection in the way of spoofing the MAC address by use of the same MAC address as the MAC address of the inspected node 90 registered in the whitelist, thus enabling the security level to be raised.

Figure 7:
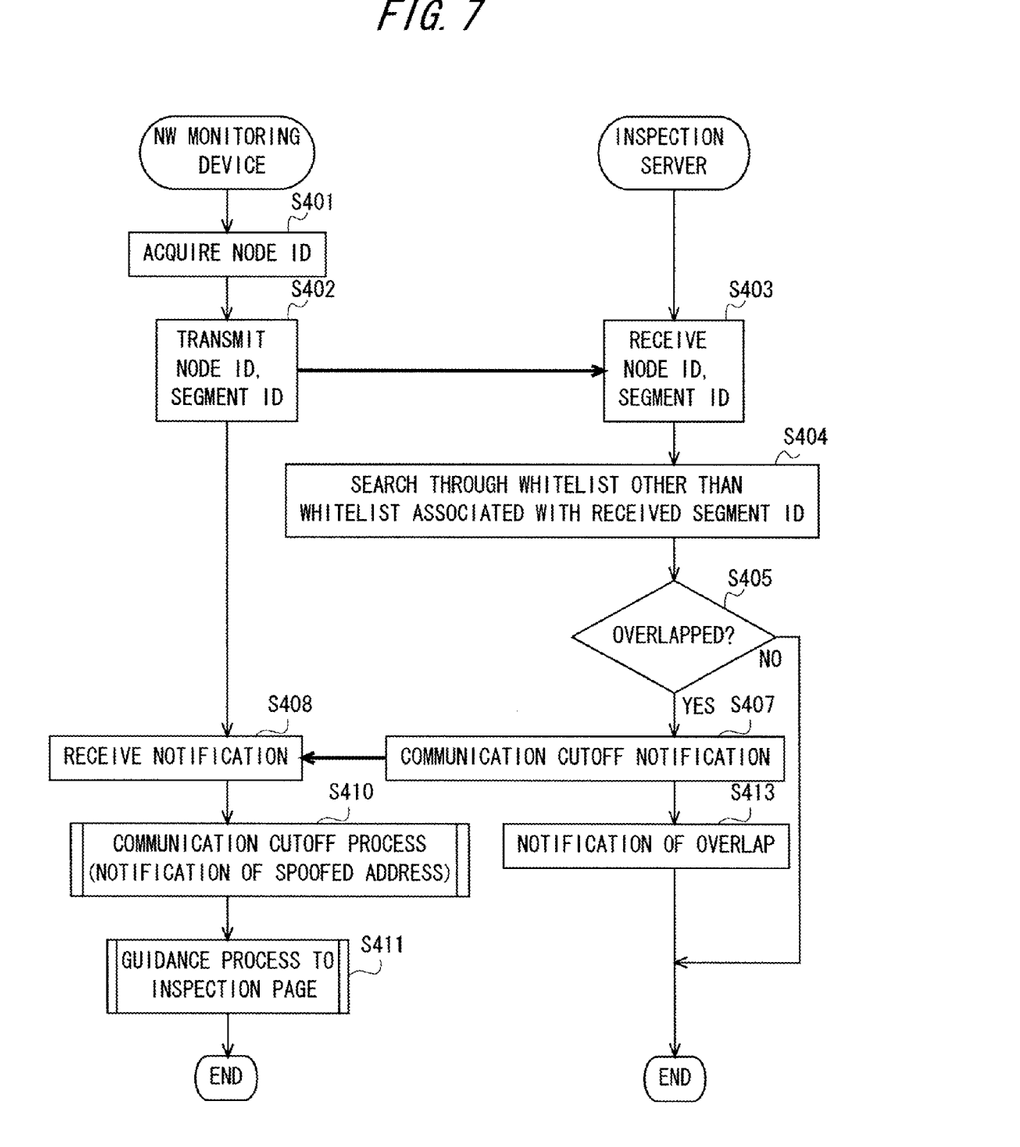
FIG. 7 is a flowchart illustrating a flow of an overlap detection process according to the embodiment.

FIG. 7 is a flowchart illustrating a flow of an overlap detection process according to the embodiment. In the inspection system 1 described above, a start of the overlap detection process according to the embodiment is triggered by the event that the node 90 of the user participates in the network segment 2, or alternatively this overlap detection process is periodically executed. Note that a specific content and a specific processing sequence of the processes given in the flowchart are each one example for carrying out the present invention. The specific content and the specific processing sequence of the processes may be properly selected corresponding to an embodiment of the present invention.

In step S401 through step S403, the node ID and the segment ID are acquired, then transmitted and received. A process in step S401 through step S403 is substantially the same as the process in step S101 through step S103 explained by use of FIG. 4, and therefore the description thereof is omitted.

In step S404 and step S405, the search through all of the whitelists 42 excluding the whitelist 42 related to the received segment ID is made in a manner that uses the received node ID, thus determining whether or not there is the node 90 having the overlapped node ID. The extraction unit 38 of the inspection server 30 searches through the whitelist 42 (which will hereinafter be also referred to as the [search target whitelist 42]) other than the whitelist 42 corresponding to the segment ID received in step S403 by use of the received node ID, thereby extracting the node 90 having the overlapped node ID but belonging to the different network segment 2 (step S404). Then, the extraction unit 38 of the inspection server 30 determines whether or not the acquired node ID is recorded in any one of the target search whitelists 42 as the result of the search, thereby determining whether or not there is the node 90 having the overlapped node ID (step S405). Herein, if the acquired node ID is registered in none of the search target whitelists (i.e., if any ID overlap is not detected), the processing shown in this flowchart is terminated. Whereas if the acquired node ID is registered in one of the search target whitelists (i.e., if the ID overlap is detected), the processing proceeds to step S407.

In step S407 through step S411, the communication cutoff notification is transmitted and received, thus cutting off the communications of the node 90. The cutoff requirement notifying unit 37 of the inspection server 30, if the node 90 having the overlapped node ID is detected in another network segment 2, transmits the communication cutoff notification to the network monitoring device 20 (step S407). When the network monitoring device 20 receives the communication cutoff notification transmitted from the inspection server 30 (step S408), the physical address spoofing unit 27 and the communication cutoff unit 21 of the network monitoring device 20 cut off the communications of the node 90 by the method such as guiding the communications of the node 90 to the destination of the packet transmission based on the ARP spoofing (step S410). Further, the physical address spoofing unit 27 of the network monitoring device 20 executes the guide process to the inspection page by the method such as transferring the packet acquired from the node 90 due to the ARP spoofing to the inspection server 30 (step S411). Details of the processes in step S410 and step S411 are substantially the same as the communication cutoff process and the guide process to the inspection page explained by use of FIG. 5, and therefore the explanations thereof are omitted.

Moreover, in step S413, a system administrator is notified of a purport that the node 90 having the overlapped node ID (MAC address) is detected in the different network segment 2. The extraction result notifying unit 39 of the inspection server 30, if the acquired node ID is registered in any one of the whitelists excluding the whitelist 42 related to the acquired segment ID, transmits to the administrator an overlap notification saying that the node 90 having the overlapped node ID (which is herein the overlapped MAC address) with the node 90 specified by the node ID transmitted in step S402 exists in another network segment 2 (step S413). Thereafter, the processes shown in this flowchart are finished.

According to the overlap detection process shown in this flowchart, the inspection system 1 including the plurality of network segments 2, if the node 90 having the overlapped node ID (the overlapped MAC address) is connected to another network segment 2, enables detection of the overlap and notification of this overlap to the user such as the administrator. In particular, it is feasible to detect the node 90 trying to elude the inspection by spoofing the MAC address in a way that employs the same MAC address as the MAC address of the inspected node 90 registered in the whitelist and to enhance the security level.

Figure 8:
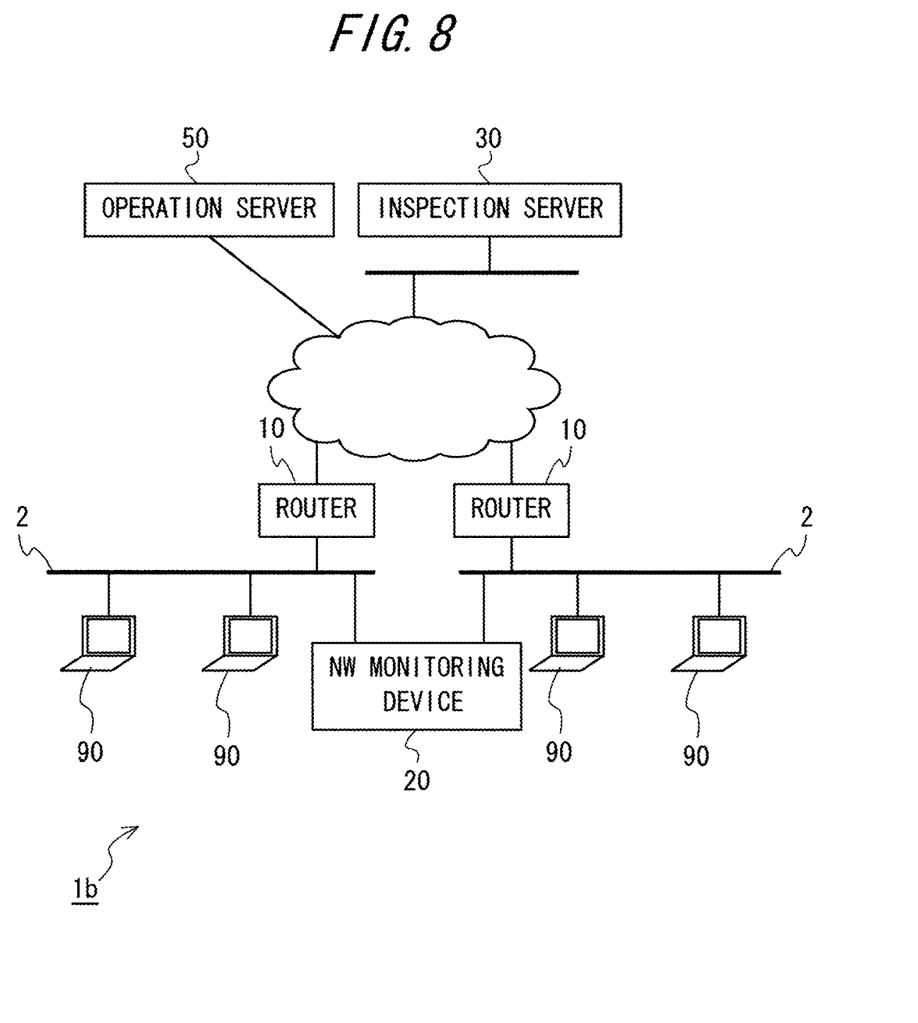
FIG. 8 is a schematic diagram depicting a variation (1) of an inspection system according to the embodiment.
Figure 9:
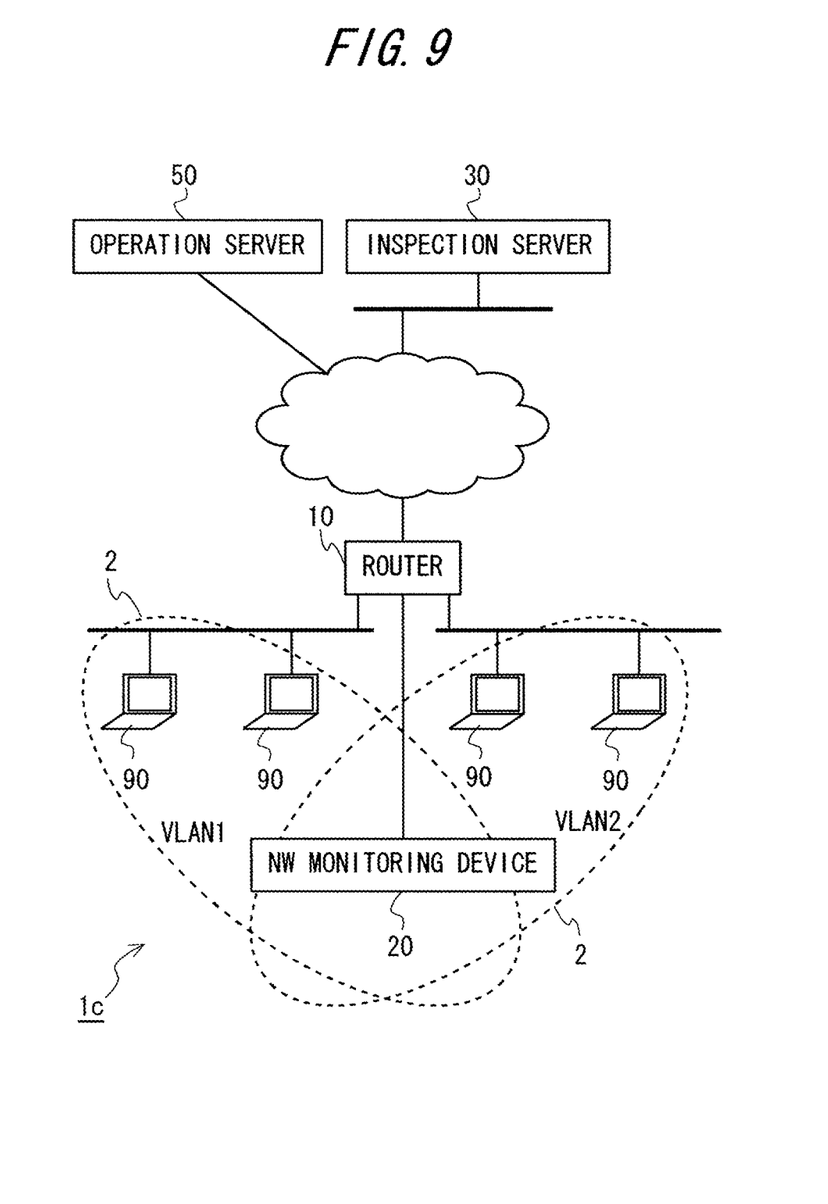
FIG. 9 is a schematic diagram depicting a variation (2) of the inspection system according to the embodiment.

Next, a variation of the network architecture in the inspection system will be discussed. FIGS. 8 and 9 are diagrams each illustrating the variation of the network architecture that may be adopted on the occasion of carrying out the present invention. In FIGS. 8 and 9, the same components as those in the embodiment discussed above are marked with the same numerals and symbols, and their descriptions are omitted.

FIG. 8 is a schematic diagram illustrating an architecture of an inspection system 1b according to the embodiment. The inspection system 1b according to the embodiment includes the plurality of network segments 2 to which the plurality of inspection target information processing devices 90 is connected, the inspection server 30 and the operation server 50, which servers are connected to the network segments 2 in the communication-enabled manner via the routers 10. Then, the network monitoring device 20 has a plurality of interfaces which are connected to the network segments 2 different from each other.

Therefore, in the inspection system 1b according to the embodiment, the single network monitoring device 20 monitors the plurality of network segments 2. Then, in the inspection system 1b, for the purpose of identifying (distinguishing between) the different network segments 2 monitored by the same network monitoring device 20, in addition to the identifying information (the MAC address, the serial number, etc) of the network monitoring device 20, an interface number (a physical port number) of the network monitoring device 20 is utilized as the segment ID. Hence, the whitelist 42 used in the inspection system 1b is generated for every segment ID containing the identifying information of the network monitoring device 20 and an identifier of the interface connected to the network segment 2 and is managed in the way of being associated with the segment ID (step S307).

Namely, when the network monitoring device 20 includes the plurality of interfaces connectible to the network segments 2 different from each other, the management information transmitting unit 24 of the network monitoring device 20 transmits, in addition to the identifying information of the network monitoring device 20, the identifier of the interface connected to the network segment 2 (step S102, step S402). Then, the management information acquiring unit 34 of the inspection server 30 acquires, in addition to the identifying information of the network monitoring device 20, the identifier of the interface of the network monitoring device 20 that is connected to the network segment 2 (step S103, step S403). Specifically, the interface identifier such as numbers, e.g., LAN1, LAN2, LAN3, . . . which are allocated to the physical ports are transmitted and received.

Therefore, the cutoff requirement determining unit 36 of the inspection server 30 specifies, based on the segment ID containing the identifying information of the network monitoring device 20 and the interface identifier that are received in step S103 and S403, the whitelist 42 corresponding to the network segment 2, and searches through the specified whitelist 42 by use of the received node ID (step S104, step S404). Namely, the inspection system 1b according to the embodiment can, even in the case where the one single network monitoring device 20 having the plurality of interfaces manages the plurality of network segments 2, correctly indentify (distinguish between) the plurality of nodes 90 having the overlapped node IDs and can perform the communication cutoff control or the communication permission control over the respective nodes 90.

FIG. 9 is a schematic diagram illustrating an architecture of an inspection system 1c according to the embodiment. The inspection system 1c according to the embodiment includes the plurality of network segments 2 to which the plurality of inspection target information processing devices 90 is connected, the inspection server 30 and the operation server 50, which servers are connected to the network segments 2 in the communication-enabled manner via the routers 10. Then, the network monitoring device 20 is connected to a plurality of VLANs (Virtual Local Area Networks).

Herein, the VLAN corresponds to the network segment 2. Namely, in the inspection system 1c according to the embodiment, one single network monitoring device 20 monitors the plurality of VLANs (network segments 2). Then, in the inspection system 1c, for the purpose of identifying (distinguishing between) the different VLANs monitored by the same network monitoring device 20, in addition to the identifying information (the MAC address, the serial number, etc) of the network monitoring device 20, identifying information of the VLAN is utilized as the segment ID. Hence, the whitelist 42 used in the inspection system 1c is generated for every segment ID containing the identifying information of the network monitoring device 20 and the identifying information of the VLAN and is managed in the way of being associated with the segment ID (step S307).

In the processes of the management information transmitting unit 24 and the cutoff requirement determining unit 36, the segment ID containing the identifying information of the network monitoring device 20 and the identifying information of the VLAN is transmitted and received and is used for specifying the whitelist 42, which is the same as in the case of the inspection system 1b described above. To be specific, as the identifiers of the VLANs, the identifiers, i.e., pieces of identifying information such as VLAN1, VLAN2 allocated to the VLANs managed by the routers 10 are transmitted and received.

Therefore, the cutoff requirement determining unit 36 of the inspection server 30 specifies, based on the segment ID containing the identifying information of the network monitoring device 20 and the identifying information of the VLAN that are received in step S103 and S403, the whitelist 42 corresponding to the network segment 2, and searches through the specified whitelist 42 by use of the received node ID (step S104, step S404). Namely, the inspection system 1c according to the embodiment can, even in the case where the one single network monitoring device 20 manages the plurality of VLANs (network segments 2), correctly indentify (distinguish between) the plurality of nodes 90 having the overlapped node IDs and can perform the communication cutoff control or the communication permission control over the respective nodes 90.

What is claimed is:

1. An information processing system comprising:
a management server which manages a plurality of networks; and
a communication cutoff device which cuts off the communications of an information processing device belonging to a network,
wherein said management server comprises:
a management processor configured to acquire device identifying information from which said information processing device can be identified and an identifier of said communication cutoff device as network identifying information from which the network to which said information processing device belongs can be identified from said communication cutoff device connecting with the network to which said information processing device specified by the device identifying information belongs, said network, which is identified by the network identifying information, with three or more information processing devices being connected;
said management processor configured to accumulate the device identifying information and the network identifying information acquired by said management processor in the way of being associated with each other so as to make it possible to determine whether cutoff of the communications of said information processing device specified by the device identifying information and the network identifying information is required or not;
said management processor configured to determine whether the cutoff of the communications of said information processing device specified by the device identifying information and the network identifying information accumulated by said management processor is required or not; and
said management processor configured to notify the communication cutoff device of the requirement or non-requirement of the communication cutoff that is determined by said management processor, and
said communication cutoff device comprises:
a communication processor configured to acquire the device identifying information;
said communication processor configured to transmit, to the management server, the device identifying information and network identifying information in the way of being associated with each other;
said communication processor configured to acquire, from said management server, information about whether the cutoff of the communications of said information processing device specified by the device identifying information is required or not; and
said communication processor configured to cut off the communications of said information processing device if said communication processor acquires the information indicating that the cutoff of the communications of said information processing device specified by the device identifying information is required.

2. An information processing system according to claim 1, said management processor further configured to:
designate said information processing device belonging to a different network and having an overlapped device identifying information by searching through the information accumulated by said management processor in a way that uses the device identifying information; and
notify a user that overlap of the device identifying information occurs if said information processing device having the overlapped device identifying information is designated.

3. An information processing system according to claim 1, wherein said management processor further acquires an identifier of an interface of said communication cutoff device connected to the network as the network identifying information.

* * * * *